(12) United States Patent
Li et al.

(10) Patent No.: US 7,734,649 B2
(45) Date of Patent: Jun. 8, 2010

(54) DERIVING AND USING DATA ACCESS CONTROL INFORMATION TO DETERMINE WHETHER TO PERMIT DERIVATIONS OF DATA ELEMENTS

(75) Inventors: Hong C. Li, El Dorado Hills, CA (US); Sigal Louchheim, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 11/025,543

(22) Filed: Dec. 28, 2004

(65) Prior Publication Data

US 2006/0143149 A1  Jun. 29, 2006

(51) Int. Cl.
*G09F 17/30* (2006.01)
(52) U.S. Cl. .................. 707/785; 707/786; 707/787; 707/789
(58) Field of Classification Search .......... 707/101, 707/9; 706/12
See application file for complete search history.

(56) References Cited

U.S. PATENT DOCUMENTS

| 2004/0117798 | A1* | 6/2004 | Newman et al. | 719/310 |
| 2004/0193912 | A1* | 9/2004 | Li et al. | 713/200 |
| 2004/0244013 | A1* | 12/2004 | Yumoto | 719/321 |

OTHER PUBLICATIONS

Verykios, et al. "State-of-the-art in Privacy Preserving Data Mining," SIGMOD Record, vol. 33, No. 1, Mar. 2004; pp. 50-57.*

Madria, Sanjay K., et al., "Research Issues in Web Data Mining," 1999, Department of Computer Science—Purdue University, pp. 303-312.*

Kulhmann, Martin, et al., "Role-mining—revealing business roles for security administration using data mining technology," 2003, Proceedings of the 8th ACM symposium on access control models and technologies, pp. 179-186.*

Fernandez-Medina, Eduardo, et al., "Access control and audit model for the multidimensional modeling of data warehouses," Dec. 6, 2005, Elsevier, pp. 1270-1289.*

An Introduction to Data Mining, http://www.thearling.com/text/dmwhite/dmwhite.htm; Oct. 31, 2004; 9 pp.

(Continued)

*Primary Examiner*—Neveen Abel Jalil
*Assistant Examiner*—Farhan M Syed
(74) *Attorney, Agent, or Firm*—Konrad Raynes & Victor LLP; David W. Victor

(57) ABSTRACT

Provided are a method, system, and program for deriving and using data access control information to determine whether to permit requested derivations of data elements. Data access control information is initialized for each of a plurality of data elements, wherein the data access control information for each associated data element includes a user access list indicating authorized users and a data access list indicating at least one data element that may be subject to a derivation operation with the associated data element. A request is received from one user to subject a first data element and a second data element to a derivation operation. The data access control information for one of the first and second data elements is processed to determine whether the user access list and data access list in the processed data access control information permits the user to perform the requested derivations of the first and second data elements.

33 Claims, 3 Drawing Sheets

OTHER PUBLICATIONS

Gadodia, R. "Right in Time," http://www.databasepipeline.com/hotwo/showArticle.jhtml . . . Nov. 17, 2004; 3 pp.

Verykios, et al. "State-of-the-art in Privacy Preserving Data Mining," SIGMOD Record, vol. 33, No. 1, Mar. 2004; 8 pp.

* cited by examiner

Data Access Control Information

DERIVING AND USING DATA ACCESS CONTROL INFORMATION TO DETERMINE WHETHER TO PERMIT DERIVATIONS OF DATA ELEMENTS

BACKGROUND

Data may be stored in data warehouses or databases that are several terabytes large, with the size increasing over time. Data mining is a process used to discover interesting patterns in different groups of data stored in the data warehouse. For instance, a data mining tool may aggregate information on customers and their purchases to determine patterns that may provide information that may be used in making marketing decisions to the customers. Data mining tools may extrapolate from aggregated data to predict trends and behaviors to provide knowledge to decision makers.

One concern with processes such as data mining is protecting confidentiality and privacy that may be comprised when a data mining tool is able to aggregate different data elements and derive confidential information or privacy information from the aggregation. In the data mining context, there is the "data inference" problem, where confidential information may be derived by discovering discernible patterns in data, even if the individual data elements alone are not confidential or secured. The pattern discovered from the data combination/aggregation may reveal highly sensitive and confidential information that needs to be protected. Another concern is that there is currently no systematic method to assure that derived data (including those data automatically generated along the path of an Enterprise Data Warehouse (EDW) pipeline) have the appropriate access control level. An EDW integrates data spread across transactional systems into a central repository, against which users may perform business analytics.

DETAILED DESCRIPTION

Figure 1:
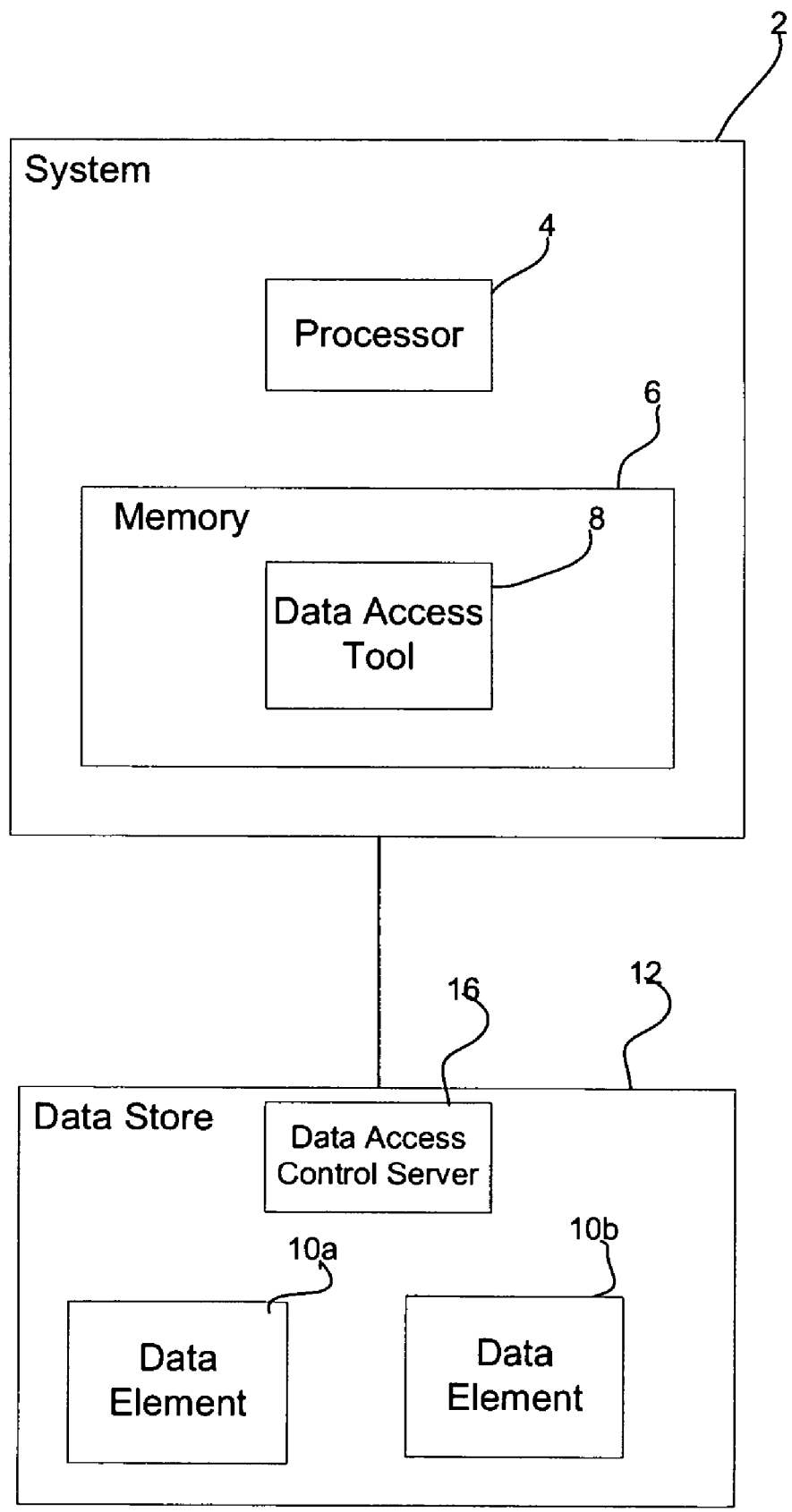
FIG. 1 illustrates an embodiment of a computing environment.

FIG. 1 illustrates a computing environment used with the described embodiments. A system 2 includes a processor 4 and memory 6 including a data access tool 8. The data access tool 8 is capable of requesting and accessing data elements 10a, 10b from a data store 12. A data element 10a, 10b comprises any type of data, an instance of textual or numerical information, a grouping of data instances, such as in the form of a table (e.g., a column, row or set of rows, etc.), document, structured document, database, etc. Further, a data element may be included in a larger or parent data element. The data access tool 8 may comprise an interface to submit data mining requests to a data access control server 16 in order to discover and derive confidential information from the data elements 10a, 10b in the data store 12. The data store 12 may comprise a database or data warehouse. The data store 12 may include any number of data elements 10a, 10b. The data access tool 8 may submit requests to search for interesting patterns in the data, such as product purchasing patterns, customer preferences, etc. The data access control server 16, which may be part of the data store 12 or in a separate server, includes algorithms to access and derive control information data based on access requests submitted by the data access tool 8. The data access control server 16 may also initialize data access control information for the data elements 10a, 10b. The data access control server 16 may further process data access requests, e.g., data mining requests, from the data access tool 8 to determine whether the user of the data access tool 8 is authorized to derive, e.g., combine or aggregate, data from requested data elements 10a, 10b. In an alternative embodiment, the data access tool 8 may perform the data mining operations directly with respect to the data store 12.

The system 2 may comprise any suitable computer system known in the art, such as a desktop computer, laptop, server, mainframe, hand held computing device, telephony device, computer networks, etc. The data store 12 may include multiple storage devices and servers to manage access to the data elements 10a, 10b in the storage devices. The storage devices in the data store 12 may comprise interconnected hard disk drives configured as a Redundant Array of Independent Disks (RAID), Just a Bunch of Disks (JBOD), etc. The data store 12 may further include magnetic tape or electronic memory storage. Further, the storage devices storing the data elements 10a, 10b in the data store 12 may be distributed over a network. The system 2 and the data store 12 may be connected by a direct interface, such as a cable or bus interface, or connected over a network, such as a Local Area Network (LAN), Storage Area Network (SAN), wireless network, the Internet, and Intranet, etc.

Figure 2:
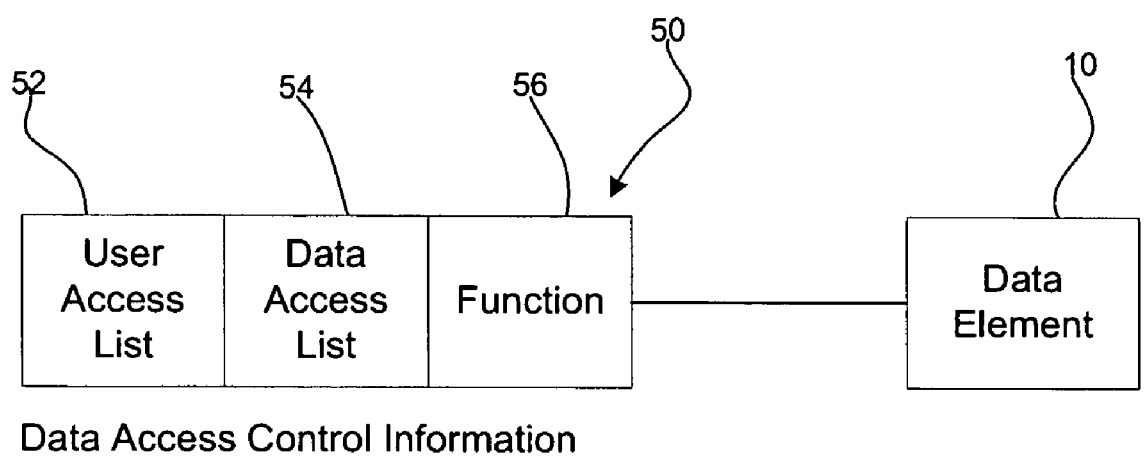
FIG. 2 illustrates an embodiment of data access control information.

FIG. 2 illustrates data access control information 50 maintained with each data element 10, such as data elements 10a, 10b, including a user access list 52 indicating users that may view or derive new (confidential) data or information from a combination of two or more data elements 10 identified in a data access list 54. The user access list 52 may identify different access levels for different users. The data access control information 50 may further identify a function 56 that is executed to determine whether a user indicated on the user access list 52 may derive a new data element from data elements on the data access list 54. The function 56 may be included with the data access control information 50 or may be an external function in a shared library for the data access control server 16 as in FIG. 1. The function 56 may further generate derived data access control information when deriving a new data element with two or more data elements indicated on the data access list 54. This derived data access control information has a new user access list 52 derived using function 56, indicating those users that may perform derivations, i.e., combinations or aggregations, with respect to data element in a new data access list, also derived using function 56, for the combined data element. The new data access information 50 for the derived data element may differ from the data access information 50 for the underlying data elements involved in the derivation to form the derived data element.

In one embodiment, a derived data element may be a pattern such as an association rule. Derived data may include, but is not limited to, aggregations or combinations of data.

The data access control information 50 may be made persistent by storing the information 50 with the data elements 10a, 10b and requiring that the data access control information 50 remain with the data elements 10a, 10b wherever they are moved or copied. Alternatively, the data access control information 50 may be maintained in a separate table or database that is processed whenever an attempt is made to derive (e.g., combine or aggregate) data elements. In such an embodiment, the data access control server 16 can determine the table entry of the data access control information 50 for one or more data elements 10a, 10b by maintaining an identifier maintained with the data element 10a, 10b that indicates the location of the data access control information 50 for that element. Data access control information 50 may be maintained at the data element 10a, 10b level, where the data access control information 50 for a data element is checked whenever attempting to combine the data element with another element. The data access control information 50 for the data elements 10a, 10b may be derived from the underlying data.

Upon copying or moving any data element 10a, 10b to another location within or external to the data store 12, the data access control server 16 ensures that the data access control information 50 or an index to the data access control information 50 for the moved or copied data element 11a, 10b, or portion thereof, remain associated with the moved or copied data element.

Figure 3:
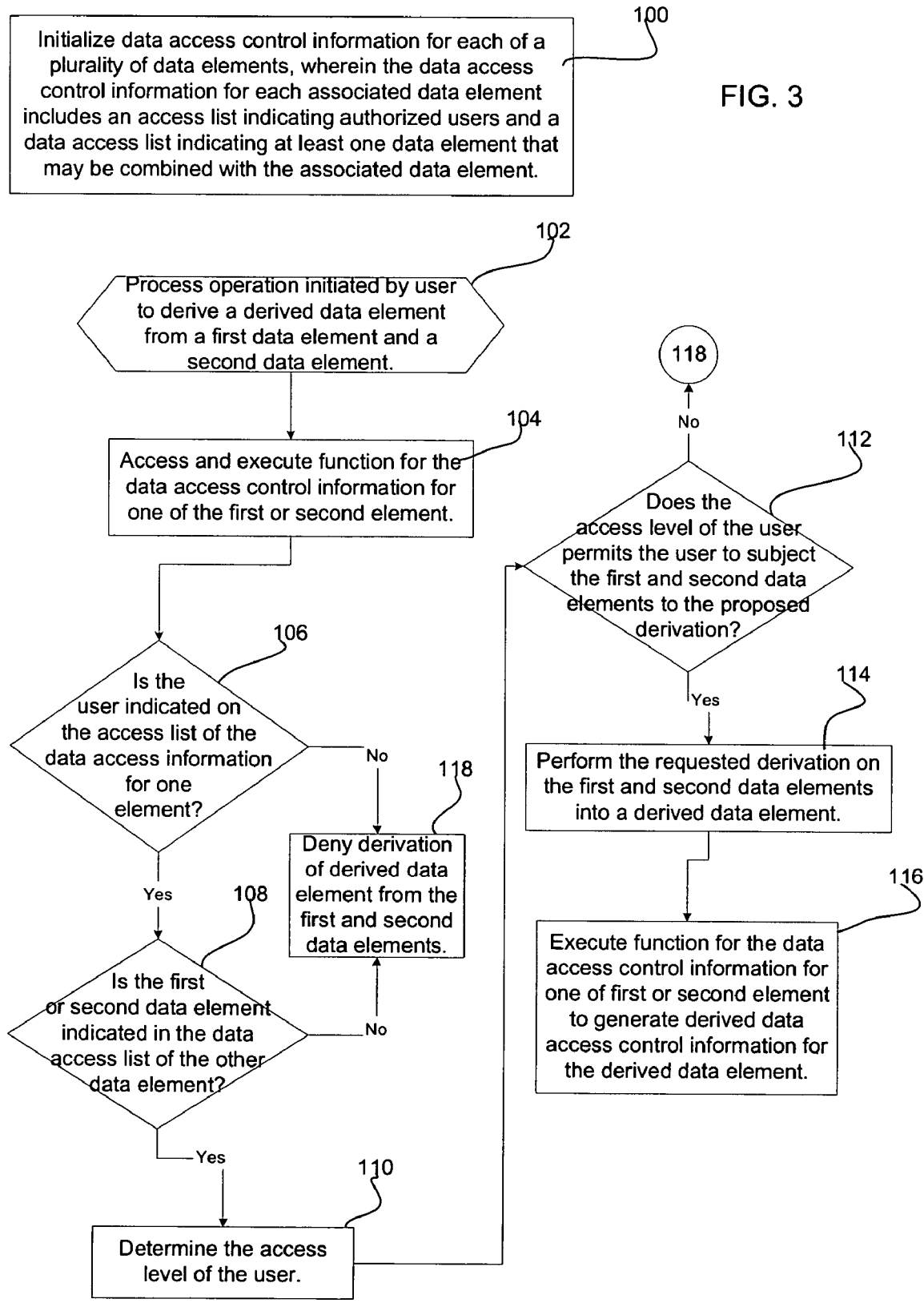
FIG. 3 illustrates an embodiment of operations to use the data access control information to determine whether to permit requested combinations of data elements.

FIG. 3 illustrates operations performed by the data access control server 16 to determine whether the user of the data access tool 8 is authorized to perform a derivation with respect to a first data element and second data element as part of a data mining or other operation. As discussed, the derivation operation may be initiated by the data access tool 8 interfacing with the data access control server 16 to identify a pattern in the data, i.e., derivations of different data elements, where each data element may comprise "component" data elements, e.g., data elements "customers" and "their purchases" contained in data element "purchase order". At block 100, the data access control server 16 initializes data access control information 50 for each of a plurality of data elements 10a, 10b. The data access control information associated with one data element may apply to all the components in the data element or different access control information may be associated with different subcomponents of the data elements 10a, 10b. Further, the access control information associated with the data element may be derived from the different access controls associated with component data elements included within or grouped by the data element. The data access control information 50 for each associated data element includes a user access list 52 indicating authorized users and a data access list 54, where an authorized user may view or modify a derived data element derived from at least one data element in the access list 54 and the associated data element. An administrator may create the data access control information 50 by determining how data elements may be derived (e.g., combined or aggregated) by different users to protect privacy and misuse of the data resulting from data aggregation. As part of initializing the data access control information 50 for a data element, e.g., 10a, the access control server 16 checks the data access control information 50 for all data elements indicated in the data access list 54 to ensure the consistency of their data access control information 50. In other words, the authorized operations indicated in the data access control information 50 for two data elements that may be involved in a derivation must permit consistent operations, i.e., if the data access control information 50 for a first data element 10a permits or denies derivation by a particular user with a second data element, then the data access control information 50 for that second data element must provide similar access and denial with respect to being combined with the first data element. This means, the data access control information 50 is consistent, i.e., has consistent user access lists 52 and data access lists 54.

At block 102, the data access control server 16 receives an operation initiated by a user system 2 to derive a new data element from a first data element 10a and a second data element 10b. As discussed, this request to derive may involve combining or aggregating data elements as part of a data mining operation to discover interesting patterns or information in the data elements. The data access control server 16 accesses and executes (at block 104) the function 56 for the data access control information for one of the first and second data elements involved in the derivation operation to perform the operations at blocks 106-118. If (at block 106) the user at the data access tool 6 initiating the data mining operation is indicated on the user access list 52 of the data access information 50 for one of the elements involved in the derivation and if (at block 108) one element to be combined is on the data access list 54 for the other data element, then a determination is made (at block 110) of the data access level of the user, which may be indicated in the user access list 52. The function 56 then determines (at block 112) whether the access level of the user permits the user to subject the first and second data elements to the derivation operation, which may be part of a query or data mining analysis. This function 56 may differ for different data elements. If the function 56 determines that the first and second elements may be subject to the requested derivation, then the function 56 performs (at block 114) the requested derivation (e.g., combination, aggregation, etc.) on the first and second data elements into a derived data element to return to the data access tool 8 or to subject to further data mining operations. The function 56 is further executed (at block 116) to generate derived data access control information for the derived data element. This derived data access control information 50 generated for the derived data element is then associated with the derived data by one of the methods described in above and used when processing a request to access the derived data or to subject the derived data element to a further derivation operation with one other data element. The data access control information 50 generated for the derived data element may be different from the data access control information of the component data elements subject to the derivation.

If the data access control information 50 indicates that access is not permitted, i.e., the user initiating the derivation operation is not on the user access list 52 (at block 106), the data elements to subject to derivation are not in the data access lists 52 (at block 108) of each other's data access control information 50 or the user access level is not sufficient to make the derivation (e.g., combination or aggregation) (at block 112), then the data access control server 16 denies (at block 118) the requested derivation of the first and second data elements.

The described embodiments provide a data access control technique to protect the derivation of data regardless of the sensitivity of the underlying data elements subject to the requested derivation operation. In this way, protection is provided from unauthorized users discovering patterns or unauthorized confidential information in data when the users may have authority to access the underlying data. In other words, the data access control information prevents users who are capable of individually accessing the first and second data elements from forming a derivation from the first and second data elements to discover a pattern or unauthorized confidential information in the data elements as part of a data mining process. In addition, the technique also ensures that any derived data are associated with proper access controls by deriving such access controls from the access control information of individual data elements.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

In the described embodiments, the data access control information was used to protect against the unauthorized disclosure of confidential or privacy information through derivations (e.g., aggregations or combinations) of the data elements. In an alternative embodiment, the data access control information may be used to protect derivations of data in other types of searches or contexts. For instance, the data access control information may be maintained for information in a relational database to determine whether to permit the execution of a query involving the derivation of different data elements. Alternatively, the data access control information 50 and data access control operations may be used in a file system to determine whether to permit the return of derived data elements or single data elements.

The illustrated operations of FIG. 3 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A computer implemented method, comprising:
    initializing data access control information associated with each of a plurality of data elements in a computer readable storage medium, wherein the data access control information associated with each of the data elements includes a user access list indicating authorized users and different access levels for authorized users, and a data access list indicating at least one data element other than the data element associated with the data access control information that may be involved in a derivation with the data element associated with the data access control information including the data access list to form a derived data element;
    receiving a derivation request from one user to subject a first and second data elements of the data elements to a derivation operation to form the derived data element, wherein the derivation comprises aggregating or combining data elements;
    processing the data access control information associated with the first and second data elements to determine whether the user access list and the data access list in the processed data access control information permit the user to derive the derived data element from the first and second data elements by performing:
        determining from the data access control information for one of the first and second data elements whether the user is indicated on the user access list of the data access control information and the access level of the user when indicated in the user access list; and
        determining whether the access level of the user permits the user to perform the requested derivation on the first and second data elements, wherein different access levels for different users permit different derivations of data elements indicated in the data access list; and
    processing, by the derivation operation, the first and second data elements to produce the derived data element comprising data based on the processed first and second data elements in response to determining that the user access list and the data access list permit the user to derive the derived data element from the first and second data elements.

2. The method of claim 1, wherein the data access control information associated with one data element applies to any data subcomponents of the data element.

3. The method of claim 2, wherein one data element comprises one of a data type, table of data, single data unit, segment of a table of data, and storage location for data.

4. The method of claim 1, wherein the user access list indicates users that are enabled to perform derivation operations with respect to the associated data element and data elements indicated in the data access list.

5. The method of claim 1, further comprising: determining whether the first or second data element is indicated in the data access list of the data access control information of the other data element, wherein the determination of whether the access level permits the user to perform the requested derivation occurs in response to determining that the first or second data element is indicated in the data access list of the other data element.

6. The method of claim 1, wherein the data access control information for the data elements includes a function, wherein the function enables the operations of determining whether the user is on the user access list and the access level and determining whether the access level of the user permits the requested derivation operation.

7. The method of claim 1, further comprising:
    copying one data element to a data element copy; and
    maintaining the association of the data access control information for the data element that is copied with the data element copy, wherein the associated data access control information is processed for any request to subject the data element copy to the derivation operation.

8. The method of claim 1, wherein the derivation operation comprises a query to access a combination of the first and second data elements.

9. The method of claim 1, wherein the derivation operation comprises an operation to form a combined data element comprising the combination of the first and second data elements, further comprising:
    generating data access control information for the combined data element that is processed in response to a user request to combine the combined data element with one other data element.

10. The method of claim 9, wherein the generated data access control information for the combined data element is different from the data access control information for the first and second elements aggregated to form the combined data element.

11. The method of claim 8, wherein the data access control information for the data elements includes a function, wherein the function included in the data access control information for one data element involved in forming the combined data element enables the operations of generating the data access control information for the combined data element.

12. The method of claim 1, wherein the request to subject the first and second data elements to the derivation operation is initiated from a data mining tool to discover an interesting pattern, confidential and/or private information in the derivation of the first and second data elements.

13. The method of claim 1, wherein users not included in the user access list are capable of individually accessing the first and second data elements, and wherein the data access control information prevents users not indicated in the user access list who are capable of individually accessing the first and second data elements from forming a derived data element from the first and second data elements to discovering an interesting pattern, confidential and/or private information in the combined data elements.

14. A system in communication with a data store having a plurality of elements and at least one user system, comprising:
    a processor; and
    a computer readable storage medium including code capable of being executed by the processor to perform operations comprising:
        initializing data access control information associated with each of a plurality of data elements in the data store, wherein the data access control information associated with each of the data elements includes a user access list indicating authorized users and different access levels for authorized users, and a data access list indicating at least one data element other than the data element associated with the data access control information that may be involved in a derivation with the data element associated with the data access control information including the data access list to form a derived data element;
        receiving a derivation request from one user to subject a first and second data elements of the data elements to a derivation operation to form the derived data element, wherein the derivation comprises aggregating or combining data elements;
        processing the data access control information associated with of the first and second data elements to determine whether the user access list and the data access list in the processed data access control information permit the user to derive the derived data element from the first and second data elements by performing:
            determining from the data access control information for one of the first and second data elements whether the user is indicated on the user access list of the data access control information and the access level of the user when indicated in the user access list; and
            determining whether the access level of the user permits the user to perform the requested derivation on the first and second data elements, wherein different access levels for different users permit different derivations of data elements indicated in the data access list; and
        processing, by the derivation operation, the first and second data elements to produce the derived data element comprising data based on the processed first and second data elements in response to determining that the user access list and the data access list permit the user to derive the derived data element from the first and second data elements.

15. The system of claim 14, wherein the user access list indicates users that are enabled to perform derivation operations with respect to the associated data element and data elements indicated in the data access list.

16. The system of claim 14, wherein the data access control information for the data elements includes a function, wherein the function enables the operations of determining whether the user is on the user access list and the access level and determining whether the access level of the user permits the requested derivation operation.

17. The system of claim 14, wherein the operations further comprise:
    copying one data element to a data element copy; and
    maintaining the association of the data access control information for the data element that is copied with the data element copy, wherein the associated data access control information is processed for any request to subject the data element copy to the derivation operation.

18. The system of claim 14, wherein the derivation operation comprises a query to access a combination of the first and second data elements.

19. The system of claim 18, wherein the derivation operation comprises an operation to form a combined data element comprising the combination of the first and second data elements, wherein the operations further comprise:
    generating data access control information for the combined data element that is processed in response to a user request to combine the combined data element with one other data element.

20. The system of claim 14, wherein the request to subject the first and second data elements to the derivation operation is initiated from a data mining tool to discover an interesting pattern, confidential and/or private information in the derivation of the first and second data elements.

21. An article of manufacture comprising at least one of a hardware device and a computer readable storage medium having code for communicating with a data store having data elements, wherein the code is enabled to cause operations to be performed, the operations comprising:
    initializing data access control information associated with each of a plurality of data elements, wherein the data access control information associated with each of the data elements includes a user access list indicating authorized users and different access levels for authorized users, and a data access list indicating at least one data element other than the data element associated with the data access control information that may be involved in a derivation with the data element associated with the data access control information including the data access list to form a derived data element;

receiving a derivation request from one user to subject a first and second data elements of the data elements to a derivation operation to form the derived data element, wherein the derivation comprises aggregating or combining data elements;

processing the data access control information associated with the first and second data elements to determine whether the user access list and the data access list in the processed data access control information permit the user to derive the derived data element from the first and second data elements by performing:

determining from the data access control information for one of the first and second data elements whether the user is indicated on the user access list of the data access control information and the access level of the user when indicated in the user access list; and determining whether the access level of the user permits the user to perform the requested derivation on the first and second data elements, wherein different access levels for different users permit different derivations of data elements indicated in the data access list; and processing, by the derivation operation, the first and second data elements to produce the derived data element comprising data based on the processed first and second data elements in response to determining that the user access list and the data access list permits the user to derive the derived data element from the first and second data elements.

22. The article of manufacture of claim 21, wherein the data access control information associated with one data element applies to any data subcomponents of the data element.

23. The article of manufacture of claim 22, wherein one data element comprises one of a data type, table of data, single data unit, segment of a table of data, and storage location for data.

24. The article of manufacture of claim 21, wherein the user access list indicates users that are enabled to perform derivation operations with respect to the associated data element and data elements indicated in the data access list.

25. The article of manufacture of claim 21, wherein the operations further comprise:

determining whether the first or second data element is indicated in the data access list of the data access control information of the other data element, wherein the determination of whether the access level permits the user to perform the requested derivation occurs in response to determining that the first or second data element is indicated in the data access list of the other data element.

26. The article of manufacture of claim 21, wherein the data access control information for the data elements includes a function, wherein the function enables the operations of determining whether the user is on the user access list and the access level and determining whether the access level of the user permits the requested derivation operation.

27. The article of manufacture of claim 21, wherein the operations further comprise:

copying one data element to a data element copy; and maintaining the association of the data access control information for the data element that is copied with the data element copy, wherein the associated data access control information is processed for any request to subject the data element copy to the derivation operation.

28. The article of manufacture of claim 21, wherein the derivation operation comprises a query to access a combination of the first and second data elements.

29. The article of manufacture of claim 28, wherein the derivation operation comprises an operation to form a combined data element comprising the combination of the first and second data elements, wherein the operations further comprise:

generating data access control information for the combined data element that is processed in response to a user request to combine the combined data element with one other data element.

30. The article of manufacture of claim 29, wherein the generated data access control information for the combined data element is different from the data access control information for the first and second elements aggregated to form the combined data element.

31. The article of manufacture of claim 29, wherein the data access control information for the data elements includes a function, wherein the function included in the data access control information for one data element involved in the derivation operation to form the combined data element enables the operations of generating the data access control information for the combined data element.

32. The article of manufacture of claim 21, wherein the request to subject the first and second data elements to the derivation operation is initiated from a data mining tool to discover an interesting pattern, confidential and/or private information in the derivation of the first and second data elements.

33. The article of manufacture of claim 21, wherein users not included in the user access list are capable of individually accessing the first and second data elements, and wherein the data access control information prevents users not indicated in the user access list who are capable of individually accessing the first and second data elements from forming a derived data element from the first and second data elements to discovering an interesting pattern, confidential and/or private information in the combined data elements.

* * * * *